(12) United States Patent
Toutonghi

(10) Patent No.: US 8,355,990 B2
(45) Date of Patent: Jan. 15, 2013

(54) SHARING AND MONETIZATION OF CONTENT

(75) Inventor: Michael J. Toutonghi, Praha (CZ)

(73) Assignee: Microsoft Corporation, Redmond, WA (US)

( * ) Notice: Subject to any disclaimer, the term of this patent is extended or adjusted under 35 U.S.C. 154(b) by 920 days.

(21) Appl. No.: 11/971,203

(22) Filed: Jan. 8, 2008

(65) Prior Publication Data

US 2009/0125391 A1    May 14, 2009

Related U.S. Application Data

(60) Provisional application No. 60/883,921, filed on Jan. 8, 2007.

(51) Int. Cl.
*G06F 21/00* (2006.01)
(52) U.S. Cl. .............................. 705/53; 705/59; 705/14.4
(58) Field of Classification Search .................... 705/22, 705/54, 903, 59, 51, 53, 910, 14.4–14.42, 705/14.49, 14.67–14.69, 14.72, 14.73; 707/705, 707/726, 732
See application file for complete search history.

(56) References Cited

U.S. PATENT DOCUMENTS

| | | | | |
|---|---|---|---|---|
| 6,948,070 B1 * | 9/2005 | Ginter et al. | ................. | 713/193 |
| 7,409,362 B2 * | 8/2008 | Calabria | ......................... | 705/26 |
| 2003/0101126 A1 * | 5/2003 | Cheung et al. | .................. | 705/37 |
| 2004/0198308 A1 * | 10/2004 | Hurst et al. | .................... | 455/403 |
| 2005/0044016 A1 * | 2/2005 | Irwin et al. | ...................... | 705/30 |
| 2005/0171838 A1 * | 8/2005 | Eglinton | ......................... | 705/14 |
| 2005/0203800 A1 * | 9/2005 | Sweeney et al. | ................. | 705/14 |
| 2006/0195442 A1 * | 8/2006 | Cone et al. | ........................ | 707/5 |
| 2007/0168543 A1 * | 7/2007 | Krikorian et al. | ............. | 709/231 |
| 2007/0271142 A1 * | 11/2007 | Coon | ............................... | 705/14 |
| 2007/0299780 A1 * | 12/2007 | Vanska et al. | .................. | 705/59 |
| 2008/0059536 A1 * | 3/2008 | Brock et al. | ................. | 707/200 |
| 2008/0154664 A1 * | 6/2008 | Kuo et al. | ......................... | 705/7 |
| 2008/0195546 A1 * | 8/2008 | Lilley | ............................. | 705/59 |

OTHER PUBLICATIONS

Gralla, "How the Internet Works", Millennium Edition, 1999, Que Corporation, Indianapolis, IN, all pages.*
Muller, "Desktop Encyclopedia of the Internet", 1999, Artech House Inc., Norwood, MA, all pages.*
White, "How Computers Work", Millennium Edition, 1999, Que Corporation, Indianapolis, IN, all pages.*
Derfler, "How Networks Work", Bestseller Edition, 1996, Ziff-Davis Press, Emeryville, CA, all pages.*
"PayPerClickUniverse: PPC glossary." Jan. 6, 2006. All pages. Retreived via Wayback Machine on May 18, 2010. http://web.archive.org/web/20060101020145/http://www.payperclickuniverse.com/pay-per-click-glossary.php.*

* cited by examiner

*Primary Examiner* — Calvin Cheung
(74) *Attorney, Agent, or Firm* — Shook Hardy & Bacon LLP

(57) ABSTRACT

Embodiments of the invention provide a method, comprising hosting content on behalf of content owners who own the content; enabling content sharers to share the content through the creation of links to the content; generating revenue through the use of the content; and sharing said revenue with the content owners and the content sharers.

20 Claims, 2 Drawing Sheets

SHARING AND MONETIZATION OF CONTENT

This application claims the benefit of priority to U.S. Provisional Patent Application No. 60/883,921 filed Jan. 8, 2007, the specification of which is hereby incorporated by reference.

FIELD

Embodiments of the present invention relate to the monetization of content.

BACKGROUND

As used herein the term "content" refers broadly to any form of digital content capable of being shared via the Internet. Common forms of content currently shared via the Internet include digital photographs (images) and videos. Content may be created by professionals or by non-professionals. Content created by professionals will be referred to as Professional-Generated Content (PGC), whereas content generated by non-professionals will be referred to as User-Generated Content (UGC).

SUMMARY OF THE INVENTION

Embodiments of the invention provide a method, comprising hosting content on behalf of content owners who own the content; enabling content sharers to share the content through the creation of links to the content; generating revenue through the use of the content; and sharing said revenue with the content owners and the content sharers.

Other aspects of the invention will be apparent from the detailed description below.

DETAILED DESCRIPTION

In the following description, for purposes of explanation, numerous specific details are set forth in order to provide a thorough understanding of the invention. It will be apparent, however, to one skilled in the art that the invention can be practiced without these specific details.

Reference in this specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Broadly, embodiments of the present invention disclose a Content Hosting and Distribution Platform (CHDP) and a revenue sharing method. Users are able to upload content in the form of either Professional-Generated Content (PGC) or User-Generated Content (UGC) to the CHDP. The CHDP may comprise an advertisement server that serves or places an advertisement to be viewed in conjunction with the content when the content is rendered on a computer of a viewer. Advertisement revenue generated from the advertisement placement is advantageously shared with the content creator. Additionally, in some embodiments, the advertisement revenue is also shared with users who enable the distribution of the content through sharing.

Figure 1:
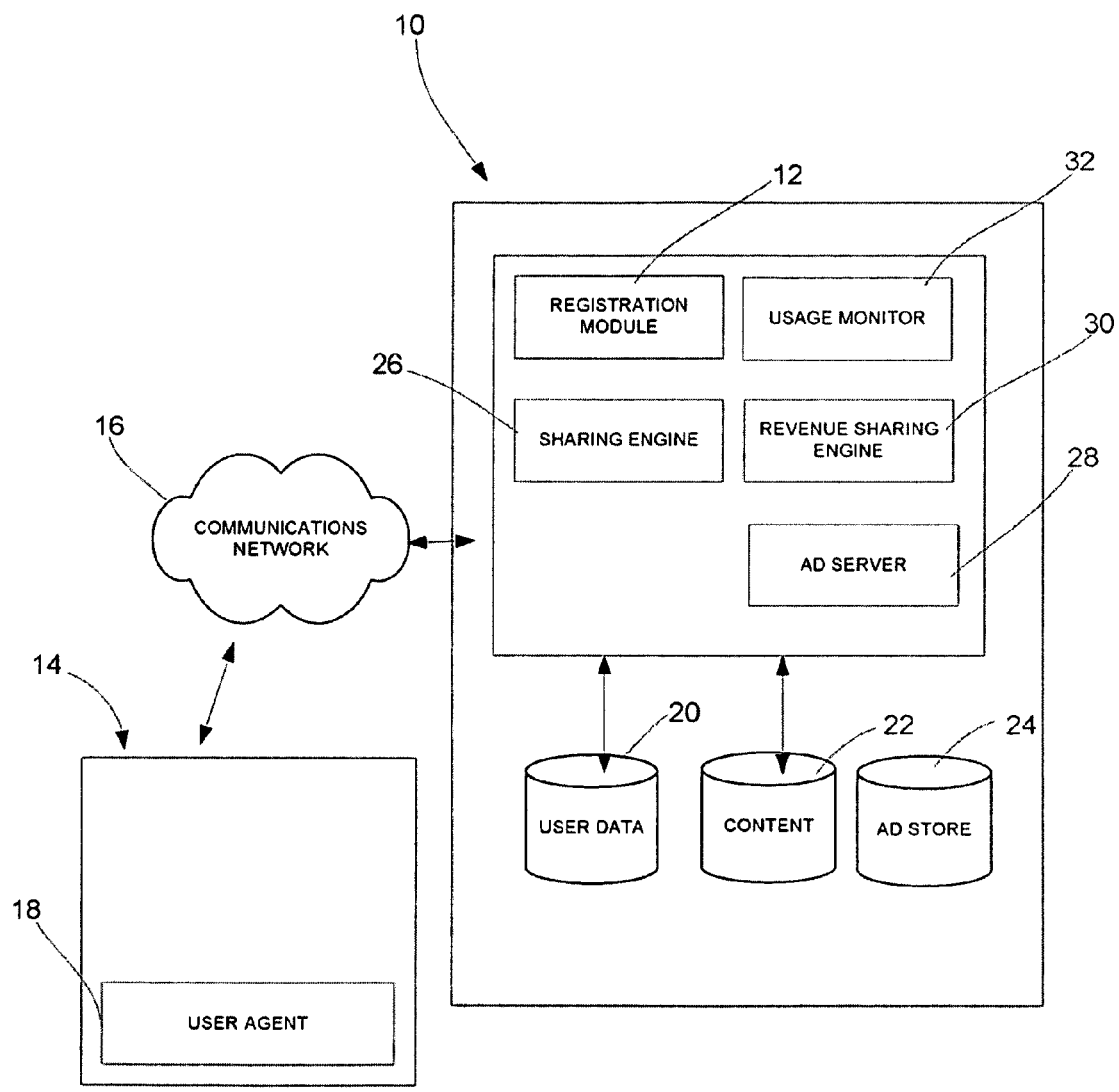
FIG. 1 shows high-level block diagram of a Content Hosting and Distribution Platform (CHDP), in accordance with one embodiment of the invention.
Figure 2:
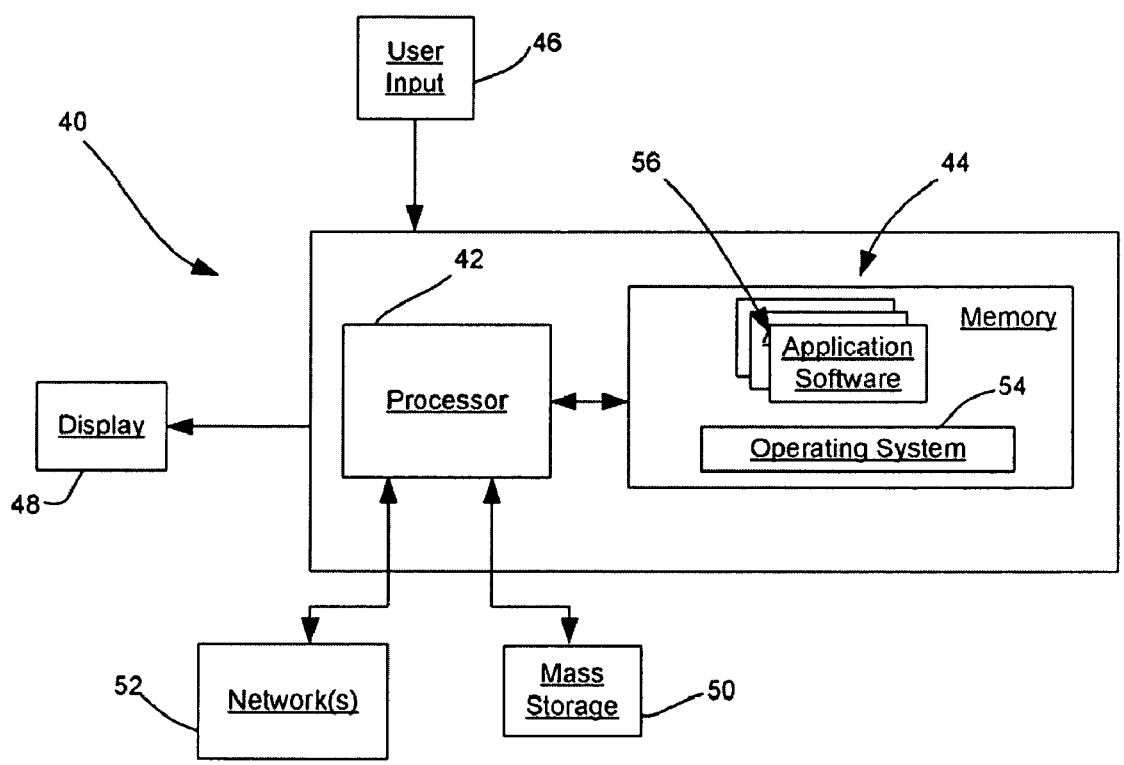
FIG. 2 shows a block diagram of hardware that may be used to implement the CHDP of FIG. 1, in accordance with one embodiment of the invention.

Referring now to FIG. 1 of the drawings, there is shown high-level block diagram of a CHDP 10, in accordance with one embodiment of the invention. The CHDP may be architected in a variety of ways and may include a single server or several servers. Hardware that may be used to implement the CHDP 10, in accordance with one embodiment is shown in FIG. 2 of the drawings.

The CHDP 10 includes functionality to host and distribute content in accordance with the techniques disclosed herein, and as part of a sharing service. As will be seen, the CHDP 10 includes a registration module 12 whereby users can register for the sharing service. In one embodiment, upon registration users are assigned authentication credentials such as a username and password whereby users may log into the sharing service via user devices 14 (only one of which has been shown in FIG. 1). The user devices 14 represent any device by which users can communicate with the CHDP 10 via a communications network 16. As such the user devices 14 may include personal computers (PCs), notebook computers, Personal Digital Assistants (PDAs), pocket PCs, smartphones, two-way pagers, etc. The communications network 16 may be a Wide Area Network (WAN) such as the Internet, and in some embodiments may include a mobile communications network such a cellular network. In one embodiment the user devices 14 include a User Agent (UA) 16 e.g. in the form of a web browser whereby the user device 14 is able download and view content from the CHDP 10.

The CHDP 10 includes user data 20 comprising information associated with each registered user. Such information may include the user's authentication information as well as profile information that may be used to find suitable content for the user. The CHDP also includes a content repository 22 for storing content to be shared. The content may include various types of digital content such as photographs, videos, music, information for blogs, etc. In one embodiment, the content may be created by a registered user and may comprise UGC or PGC. Advertisements to be served or placed with content from the content repository are stored in an advertisement store 24. In one embodiment, the content in the content repository is uploaded from the user devices 14 via the communications network 16.

The CHDP 10 also includes a sharing engine 26 that implements logic to facilitate the sharing of content in the content repository 22. In one embodiment, the sharing engine 26 may locate suitable content for a user from the content repository 22. The content may be located based on a parameters received from the user. Such parameters may comprise keywords input by the user. In some embodiments, the content may be located based on profile information such as the users particular interests stored as part of the user data 20.

In one embodiment, the sharing engine 26 may allow a user to share content with a third party. In such cases, the sharing engine may compose a link that is then sent to the third party. The link may be delivered via email or via a SMS message to the third party. The third party may be a registered user of the sharing service, but this need not be the case.

Once the third party receives the link, the link may be used by the third party to download and view the content associated with the link, In this manner the sharing of content is facilitated.

In some embodiments, links to share content may be placed on third party websites. Such links may be accessed through the third party websites in order to access the content associated with the links.

Each link generated by the sharing engine 26 is tied to the particular user that caused the link to be created. For example, in one embodiment, a unique identifier associated with the particular user is included with the link (e.g. with a URL defining the link). Thus, when the link is used to retrieve the content associated therewith the CHDP 10 is able to determine that user that shared the link.

It will be appreciated that through the mechanism of the sharing engine 26, links to content in the content repository 22 may be created and shared in an almost viral-like fashion.

In one embodiment, the CHDP 10 also includes an advertisement server 28. The advertisement server 28 includes logic to find relevant advertisements from the advertisement store 24 to serve with the content. Various techniques may be used to find relevant advertisements. For example, in one embodiment, content in the content repository 22 may be tagged with keyword descriptive of the content or descriptive of products and services relevant to the content based on the likely consumer of the content. The tags may be created by the users of the system or the operators of the sharing service. The advertisements in the advertisement store 24 may comprise associated tags or keywords to help determine the relevant content with which to serve the advertisements. These associated tags may be created by the advertisers themselves. As such, embodiments of the advertisement server 28 also include functionality for advertisers to create and tag advertisements.

When a request for content (in the form of a link to content in the content repository 22) is received, the advertisement server finds a relevant advertisement from the advertisement store 24 and serves this relevant advertisement together with the content identified in the link to the user device 14 from which was received. The relevant advertisement may be embedded in the content or it may be played before or after the content. Each time an advertisement is served by the advertisement server 28 the advertiser associated with the advertisement is charged in accordance with an agreement between the operators of the sharing service and the advertiser.

In one embodiment, the CHDP 10 also includes a revenue sharing engine 30. This component includes functionality to determine the users associated with a link with whom to share advertising revenue, and functionality to compute the amount of the advertising revenue to share.

Content that is served with advertisements are referred to as "ad-funded" content. In some embodiments, advertisements are not delivered with content. This type of content is termed "pay-for-use" content as users are charged an amount before the content can be accessed.

In accordance with the revenue sharing method disclosed herein, the users with whom advertising revenue is shared include the owner of the content with which advertisements were delivered and the chain of users who shared links to the content with others. In one embodiment of the revenue sharing method, the content owner gets a percentage of the money generated from the content. For example, an owner of content may get 40% of the money generated from the content of it is ad-funded and 60% of the money generated from the content if it is "pay-for-use" content. For content that is shared through the creation of links to the content as described above, each registered user who creates a link for sharing the content (hereinafter the "content sharer") is compensated as follows: when content is re-shared the previous content sharer gets 5% of the revenue generated from the content for a predefined number, say 4, levels of sharing. In one embodiment a designated charity is given 5% of the revenue from shared content. The designated charity may be designated by the owner of the content or by the operators of the sharing service. To discourage piracy, pirated content does not earn revenue through the model described.

FIG. 2 of the drawings shows an example of hardware 40 that may be used to implement the user device 14 or the CHDP 10, in accordance with one embodiment of the invention. The hardware 40 typically includes at least one processor 402 coupled to a memory 44. The processor 42 may represent one or more processors (e.g., microprocessors), and the memory 44 may represent random access memory (RAM) devices comprising a main storage of the hardware 40, as well as any supplemental levels of memory e.g., cache memories, non-volatile or back-up memories (e.g. programmable or flash memories), read-only memories, etc. In addition, the memory 44 may be considered to include memory storage physically located elsewhere in the hardware 40, e.g. any cache memory in the processor 42, as well as any storage capacity used as a virtual memory, e.g., as stored on a mass storage device 50.

The hardware 40 also typically receives a number of inputs and outputs for communicating information externally. For interface with a user or operator, the hardware 40 may include one or more user input devices 46 (e.g., a keyboard, a mouse, etc.) and a display 48 (e.g., a Liquid Crystal Display (LCD) panel).

For additional storage, the hardware 40 may also include one or more mass storage devices 50, e.g., a floppy or other removable disk drive, a hard disk drive, a Direct Access Storage Device (DASD), an optical drive (e.g. a Compact Disk (CD) drive, a Digital Versatile Disk (DVD) drive, etc.) and/or a tape drive, among others. Furthermore, the hardware 40 may include an interface with one or more networks 52 (e.g., a local area network (LAN), a wide area network (WAN), a wireless network, and/or the Internet among others) to permit the communication of information with other computers coupled to the networks. It should be appreciated that the hardware 40 typically includes suitable analog and/or digital interfaces between the processor 42 and each of the components 44, 46, 48 and 52 as is well known in the art.

The hardware 40 operates under the control of an operating system 54, and executes various computer software applications, components, programs, objects, modules, etc. indicated collectively by reference numeral 56 to perform the above-described operations of the user device 14 or the CHDP 10. In the case of a server various applications, components, programs, objects, etc. may also execute on one or more processors in another computer coupled to the hardware 40 via a network 52, e.g. in a distributed computing environment, whereby the processing required to implement the functions of a computer program may be allocated to multiple computers over a network.

In general, the routines executed to implement the embodiments of the invention, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processors in a computer, cause the computer to perform operations necessary to execute elements involving the various aspects of the invention. Moreover, while the invention has been described in the context of fully functioning computers and computer systems, those skilled in the art will appreciate that the various embodiments of the invention are capable of being distributed as a program product in a variety of forms, and that the invention applies equally regardless of the particular type of machine or computer-readable media used to actually effect the distribution. Examples of computer-readable media include physical, recordable type media such as volatile and non-volatile memory devices, floppy and other removable disks, hard disk drives, optical disks (e.g., Compact Disk Read-Only Memory (CD ROMS), Digital Versatile Disks (DVDs), etc.).

Although the present invention has been described with reference to specific exemplary embodiments, it will be evident that the various modification and changes can be made to these embodiments without departing from the broader spirit of the invention. Accordingly, the specification and drawings are to be regarded in an illustrative sense rather than in a restrictive sense.

The invention claimed is:

1. A method, comprising:
    hosting at a computing device having a processor and a memory, content on behalf of content owners who own the content;
    enabling a registered user to share the content with a third party through a creation of a link to the content, wherein the link is tied to the registered user that caused the link to be created, and wherein the third party re-shares the link with at least one subsequent party;
    delivering the link to the third party via an email or short-message service (SMS) message;
    generating revenue through use of the content by one or more of displaying one or more advertisements with the content and charging a fee for the use of the content;
    identifying the registered user that is tied to the link when the link is used by the at least one subsequent party to retrieve the content; and
    sharing said revenue with the content owners and the registered user that is tied to the link to the shared content, wherein the revenue is shared between the content owners and the registered user that is tied to the link to the shared content in a first proportion when the revenue is generated from advertisements and in a second proportion when the revenue is generated from fees charged for use of the content.

2. The method of claim 1, further comprising sharing said revenue with a designated charity.

3. The method of claim 2, wherein the designated charity is paid 5% of the revenue from the sharing of the content provided the sharing of the content does not infringe the rights of any party.

4. The method of claim 1, wherein the content owners are paid 60% of the revenue generated from the sharing of the content if the content is ad-funded.

5. The method of claim 1, wherein the content owners are paid 40% of the revenue generated from the sharing of the content if the content is pay-for-use content.

6. The method of claim 1, wherein the registered user is paid a percentage of the revenue generated from a predefined number of levels of sharing by the at least one subsequent users who re-share the content.

7. The method of claim 6, wherein the predefined number of levels is 4.

8. The method of claim 6, wherein the percentage is 5%.

9. The method of claim 1, wherein the one or more advertisements for display with the content are determined based on keywords associated with the one or more advertisements.

10. A system, comprising:
    a content repository comprising one or more hardware computer-readable media to store content on behalf of content owners who own the content;
    a sharing engine
        to enable a content sharer to share the content with a third party through a creation of a link to the content that is tied to the content sharer that caused the link to be created, and
        to deliver the link to the third party via an email or an short-message service (SMS) message, the link being further shareable by the third party with at least one subsequent party; and
    a revenue sharing engine
        that identifies a registered user that is tied to the link when the link is used by the at least one subsequent party to retrieve the content, and
        that determines proportions in which revenue generated from one or more of advertisements placed in association with the content and fees charged for use of the content is to be shared between the content owners and the content sharer that is tied to the link to the content,
    wherein the revenue is shared between the content owners and the registered user that is tied to the link to the shared content in a first proportion when the revenue is generated from advertisements and in a second proportion when the revenue is generated from fees charged for use of the content.

11. The system of claim 10, the revenue sharing engine shares said revenue with a designated charity.

12. The system of claim 11, wherein the designated charity is paid 5% of the revenue from the sharing of the content provided the sharing of the content does not infringe the rights of any party.

13. The system of claim 10, wherein the content owners are paid 60% of the revenue generated from the sharing of the content if the content is ad-funded.

14. The system of claim 10, wherein the content owners are paid 40% of the revenue generated from the sharing of the content if the content is pay-for-use content.

15. The system of claim 10, wherein the content sharer is paid a percentage of the revenue generated from a predefined number of levels of sharing by subsequent sharers who re-share the content.

16. The system of claim 15, wherein the predefined number of levels is 4.

17. The system of claim 15, wherein the percentage is 5%.

18. The system of claim 10, wherein the one or more advertisements placed in association with the content are determined based on keywords associated with the one or more advertisements.

19. One or more hardware computer-readable media having computer-executable instructions embodied thereon that, when executed, perform a method, the method comprising:
    hosting at a computing device having a processor and a memory, digital content on behalf of a content owner who owns the digital content;
    creating a link to the content at a request of a registered user for sharing the content with one or more third parties, wherein the link includes a unique identifier associated with the registered user;
    delivering the link to the one or more third parties via an email or short-message service (SMS) message, wherein at least one of the third parties subsequently re-shares the link with at least one subsequent party;

providing the content to the at least one subsequent party when the link is used to retrieve the content;

generating revenue through use of the content by the at least one subsequent party by one or more of displaying an advertisement with the content and charging a fee for the use of the content;

identifying the registered user that requested the creation of the link based on the unique identifier included with the link when the link is used to retrieve the content; and sharing the revenue between the content owner, the registered user, and one or more of the third parties based on whether the revenue is generated from advertisements or fees for use and based on a status as the content owner, the registered user, or a third party, wherein the revenue is shared between the content owner and the registered user that is tied to the link to the shared content in a first proportion when the revenue is generated from advertisements and in a second proportion when the revenue is generated from fees charged for use of the content.

20. The hardware computer-readable media of claim 19, wherein the advertisement for display with the content is determined based on keywords associated with the advertisement.

* * * * *